Patented Jan. 19, 1954

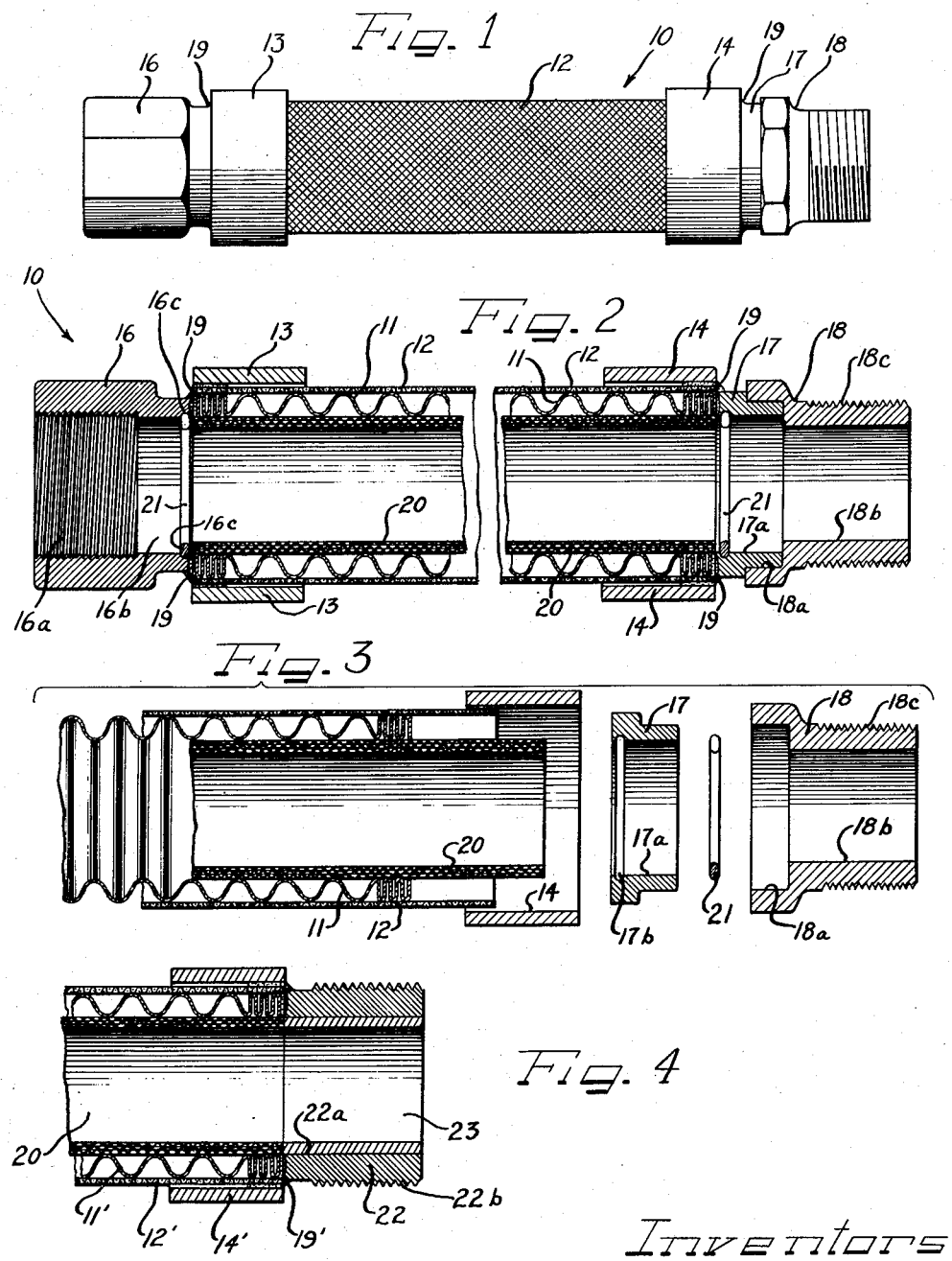

2,666,657

UNITED STATES PATENT OFFICE

2,666,657

CORROSION-RESISTING FLEXIBLE CONNECTOR

John G. Howard and Raymond Harry Thomas, Chicago, Ill., assignors to The Pyle-National Company, Chicago, Ill., a corporation of New Jersey Application February 17, 1950, Serial No. 144,714

3 Claims. (Cl. 285—206)

This invention relates generally to a flexible electrical connector as is frequently employed between an electrical conduit and an operating mechanism, or between two electrical conduits which must be placed in communication with one another.

More specifically, the present invention relates to a novel corrosion-resisting flexible connector and a process for making such a structure, all of the elements employed in the structure being made of such a material as to effectively resist the deleterious effect of exposure to an environment in which harmful or dangerous corrosion occurs.

Flexible fittings have been provided heretofore which were particularly designed to fulfill the safety requirements attendant upon the use of such fittings in a hazardous location, for example, a location where an explosive mixture is likely to prevail in the atmosphere surrounding the electrical fittings. Such fittings have usually been made out of ordinary metals which are not corrosion-resistant and have been fabricated in a conventional manner by use of ordinary welding or brazing or soldering procedures.

A fitting of this nature, of course, is seriously deficient if it is necessary to employ the flexible electrical fitting in an environment where not only are explosive mixtures likely to be present, but the atmosphere surrounding the fittings is likely to contain corrosive substances which attack the elements of the electrical fitting as well as the welded, brazed or soldered joints connecting the various elements.

According to the general features of the present invention, a corrosion-resistant flexible electrical connection fitting is provided having a novel end fitting structure which permits the fitting to be manufactured according to a unique and efficient process.

A metal bellows-like tube, a flexible braided metal sleeve and a ring-like end fitting are assembled in concentrically disposed array and a metal coupling connector is placed in abutting relationship thereto. All of these elements are made of a suitable corrosion-resistant metal such as stainless steel or the like. An electric-arc welding process is then employed to integrate all of the aforementioned elements. The welded joints are also resistant to attack by corrosive substances. The inner bore of the bellows-like tube is then lined with a tubular loom of flexible electrically non-conductive material and the loom is locked against axial displacement to complete the assembly of the fitting.

It is, therefore, an object of the present invention to provide a corrosion-resistant electrical connection fitting which overcomes the deficiencies of flexible fittings heretofore provided.

Another object of the present invention is to provide a process for making a corrosion-resistant flexible electrical connection fitting by which the fitting may be suitably lined with a flexible electrically non-conductive material, but during the assembly of which, the lined material will not be consumed or damaged because of exposure to excessive temperatures.

A further object of the present invention is to provide a flexible electrical connection fitting which will not only offer protection against explosion hazards, but will, in addition, resist attack by corrosive substances surrounding the fitting.

Another object of the present invention is to provide an explosion-proof, corrosion-resistant, flexible, electrical, connecting fitting which is durable in use and which may be economically produced.

Many other features, advantages and additional objects of the present invention will become manifest to those versed in the art upon making reference to the detailed description which follows and the accompanying drawings in which Figure 1 is an elevational view of an explosion-proof, corrosion-resistant electrical connection fitting according to the present invention;

Figure 2 is a slightly enlarged cross-sectional view, broken in part, of the fitting shown in Figure 1;

Figure 3 is an enlarged cross-sectional exploded view showing additional details of construction and helping to explain the steps of the process of the present invention; and Figure 4 is a fragmentary cross-sectional view of an alternative embodiment of the present invention.

As shown on the drawings:

In providing a flexible electrical connection fitting, it is necessary to employ a body portion which is flexible to a marked degree and which will be expansible without damage in the event the body is exposed to the shock of an explosion. The body must also effect a flame-proof seal of the conductors enclosed thereby to preclude inadvertent ignition of explosive mixtures surrounding the fitting.

It will be readily apparent, however, that the body must also be so substantial and so strong that should an arcing occur within the body of the fitting, there must be no danger of burning through the body wall.

In meeting these difficulties, flexible fittings have heretofore been provided which include a flexible bellows-like tube surrounded by a flexible metal braid to comprise the body portion of the fitting. A tubular loom of flexible electrically non-conductive material has been used to line the inside of the tube to prevent burn-through of the tube walls.

In constructing a corrosion-resistant fitting, additional problems are presented. Ordinary joints provided by electric welding, gas welding, brazing, or soldering are all susceptible to destruction when subjected to the attack of corrosive substances. Thus, even if a substitution of materials were made so that the flexible braided sleeve and the bellows-like tube were made of corrosive-resistant material, the fitting would be deficient because the joints would be subject to deterioration and hence, the fitting would not fulfill the safety requirements necessary for employment in a hazardous location.

On the other hand, if special techniques are employed in producing a corrosion-resistant joint, for example, the technique of stainless steel welding, the heat produced during the course of the welding procedure is so excessive as to consume or seriously damage the tubular loom lining the inside of the bellows-like tube. In such circumstances, the fitting is also deficient since for safety purposes, the tubular loom should present an unbroken tubular bore for the electrical conductors which are passed through the fitting.

The process and the structure of the present invention completely avoid all of the difficulties outlined.

As may be seen upon making reference to the drawings, the present invention contemplates the provision of an explosion-proof corrosion-resistant flexible electrical connection fitting which is indicated generally by the reference numeral 10. A bellows-like tube 11 made of a corrosion-resistant metal such as stainless steel or the like is provided and a flexible metal braided sleeve 12, also made of a corrosion-resistant metal such as stainless steel or the like, is placed in surrounding relationship to the tube 11.

At each end of this sub-assembly and in concentric relationship thereto is placed a metal end fitting preferably made of a corrosion-resistant metal such as stainless steel or the like. As shown in this particular embodiment, the end fittings include a ring 13 and a ring 14.

A metal coupling connector made of a corrosion-resistant metal such as stainless steel is then placed in abutting relationship to the previously assembled elements. As shown in this particular embodiment, a female coupling connector 16 is provided on one end which defines an internal bore partially threaded as at 16a and smooth portion as at 16b.

A ring 17 is situated on the opposite end of the fitting and defines an external surface suitable for reception in a male coupling connector 18 having a counterbore portion 18a and a smooth bore 18b with an externally threaded portion 18c. The ring 17 defines a smooth bore 17a with an annular ring-seating groove 17b formed adjacent one end thereof.

It may be noted that the bore 16b of the female coupling connector and the bore 17a of the ring 17 are approximately equal in diameter to the diameter of the innermost undulations defined by the bellows-like tube 11.

An electric-arc welding process, preferably according to a stainless steel welding technique, may be employed to integrate the coupling connectors 16 and 17, the rings 13 and 14, the bellows-like tube 11 and the flexible braided sleeve 12, thereby producing a pair of welded joints indicated generally by the reference numeral 19, 19 (Fig. 2).

After all of the aforementioned elements have been placed in firm assembly with one another by welding, the inside bore of the bellows-like tube 11 is lined with a flexible tubular loom preferably made of an electrically non-conductive material indicated generally by the reference numeral 20.

After the loom 20 has been positioned within the fitting, it is locked against axial displacement. As shown in the embodiment of Figures 2 and 3, the female coupling connector 16 is provided with an annular ring-seating groove 16c and a pair of resilient snap rings 21, 21 are seated in the seating groove 16c of the female coupling connector 16, as well as in the seating groove 17b of the ring 17 in substantial abutting relationship to the ends of the loom 20, thereby precluding axial displacement of the loom 20 relative to the other elements of the fitting 10.

In the alternative embodiment of Figure 4, no intermediate element corresponding to the ring 17 is provided and a male coupling connector 22 having a smooth bore 22a and an externally threaded portion 22b is integrated directly with a bellows-like tube 11', a flexible braided sleeve 12' and a ring 14' by means of a welded joint 19'. After the tube 11' is lined with a loom 20', the loom 20' is locked in axial displacement by press fitting a bushing 23 into the bore 22a of the male coupling connector 22 into abutting relationship with the loom 20'.

As a further alternative in the process of making the fitting of the present invention, the bushing 23 and the bore 22a of the male coupling connector 22 can be dimensionally related so that the bushing 23 may be placed in firm assembly within the male coupling connector 22 with a shrink fit.

It may also be noted that the ring 17 and the male coupling connector 18 shown in the embodiment of Figures 1, 2 and 3 may be integrated with one another by press fitting or shrink fitting as desired.

It will be evident that the process of making a flexible fitting as described completely eliminates the necessity of exposing the looms 20 or 20' to the excessive temperatures developed during a welding process. Moreover, it will be evident that all of the elements embodied in the fitting of this invention which are exposed to atmospheric conditions including the welded joints 19 and 19', are made of corrosion-resistant metal and are, therefore, capable of withstanding attack by corrosive substances. Thus, we have described a fitting which will successfully operate in a corrosive atmosphere without danger of decreasing the explosion-proof characteristics thereof.

It is contemplated that various persons skilled in the art might suggest minor modifications to the preferred embodiment herein shown and described in detail for the sake of clarity, however, it should be understood that we wish to embody within the scope of this patent all such embodiments as come within the scope of our contribution to the art.

We claim as our invention:

1. A corrosion-resistant flexible electrical conduit comprising, inner, outer, and intermediate concentric sleeves consisting of a flexible corrosion resistant metal braided sleeve, a flexible tubular loom of electrically non-conductive, heat consumable material, and a flexible bellows-like corrosion-resistant metal tube, respectively, a female coupling connector having a bore extending therethrough of larger diameter than said loom but of smaller diameter than said tube, a protective ring surrounding the end of said concentric sleeves adjacent said coupling connector, an annular welded joint of corrosion-resistant metal integrating by high temperature thermal fusion said coupling connector, said ring, said braided sleeve, and said tube, and a retainer member inserted in said bore of said coupling connector and in firm assembly therewith and being of smaller diameter than said loom, said loom being inserted through said bore of said coupling connector only after said welded joint is sufficiently cooled to preclude consumption of said loom, and said retainer being inserted in said bore to retain said loom in said conduit.

2. A corrosion-resistant flexible electrical conduit as defined in claim 1 wherein said retainer member comprises a bushing fitted in firm assembly within said bore of said coupling connector.

3. A corrosion-resistant flexible electrical conduit as defined in claim 1, said bore having an annular recess formed therein, and said retainer member more specifically comprising a snap ring seated in said annular recess for abutting said tubular loom.

JOHN G. HOWARD.
RAYMOND HARRY THOMAS.

References Cited in the file of this patent

UNITED STATES PATENTS

| Number | Name | Date |
| --- | --- | --- |
| 1,993,984 | Wulle et al. | Mar. 12, 1935 |
| 2,025,545 | Muff | Dec. 24, 1935 |
| 2,360,608 | Kauffman | Oct. 17, 1944 |
| 2,449,356 | Wikoff | Sept. 14, 1948 |
| 2,451,438 | Hartman | Oct. 12, 1948 |
| 2,452,057 | Kehoe | Oct. 26, 1948 |
| 2,516,631 | Jacobson | July 25, 1950 |